United States Patent [19]
Olsen et al.

[11] 3,951,478
[45] Apr. 20, 1976

[54] VACUUM ASSEMBLY

[75] Inventors: Harry G. Olsen, Woburn; Peter Oberhauser, Sudbury, both of Mass.

[73] Assignee: GTE Laboratories Incorporated, Waltham, Mass.

[22] Filed: May 22, 1975

[21] Appl. No.: 580,108

[52] U.S. Cl. ............................................. 308/36.1
[51] Int. Cl.² ........................................... F16C 1/24
[58] Field of Search .................. 308/36.1, DIG. 7; 51/362

[56] References Cited
UNITED STATES PATENTS

| | | | |
|---|---|---|---|
| 2,518,338 | 8/1950 | Lampe | 308/36.1 |
| 2,713,522 | 7/1955 | Petch | 308/36.1 |
| 2,776,173 | 1/1957 | Rudy | 308/36.1 |
| 3,062,555 | 11/1962 | Britton | 308/36.1 |
| 3,125,126 | 3/1964 | Engels | 308/DIG. 7 |
| 3,168,320 | 2/1965 | Sneed | 308/DIG. 7 |
| 3,220,756 | 11/1965 | Templeton | 308/36.1 |
| 3,400,988 | 9/1968 | Hudson et al. | 308/DIG. 7 |

*Primary Examiner*—M. H. Wood, Jr.
*Assistant Examiner*—Gene A. Church
*Attorney, Agent, or Firm*—Irving M. Kriegsman; Leslie J. Hart

[57] ABSTRACT

A rotating vacuum shaft assembly includes a housing, a hollow shaft positioned in an opening in the housing and at least one seal made of a fluorocarbon polymer material disposed in the region around the shaft to permit a vacuum to be drawn through the shaft while it is rotated. The seal has deformable ribs which contact the surface of the shaft and the internal walls of the housing, the ribs deforming when a pressure difference exists across the seal thereby enhancing the quality of the seal.

11 Claims, 3 Drawing Figures

VACUUM ASSEMBLY

BACKGROUND OF THE INVENTION

The present invention relates to the art of vacuum assemblies of the type in which a vacuum seal must be maintained around the periphery of a shaft which may rotate about and/or move along its longitudinal axis.

In one assembly the shaft is hollow and the vacuum is drawn through the shaft. Such rotating vacuum shaft assemblies are used in many applications, glass shaping being a typical application. Typically, glass is shaped by the application of heat as it rotates on a suitable machine, such as a lathe. The glass is located around a mandrel which is turned on the lathe. As heat is applied to the glass, it becomes pliable. To form the glass into the shape of the mandrel it is advantageous to reduce the pressure within the volume of the glass so that the pressure difference across the glass causes the glass to conform in shape to the mandrel. Thus, some type of rotating vacuum shaft assembly is needed; typically the assembly is mounted on the lathe tail stock so that the vacuum is transmitted to the mandrel via a rotating shaft. A vacuum pump is connected to the assembly so that the vacuum is drawn through the end of the shaft mounted on the assembly.

Such assemblies are not, per se, novel. One known assembly uses an O-ring seal with vacuum grease, the O-ring seal being located on either side of the pumping orifice. This seal requires some pressure to be exerted on the shaft thereby making the shaft not as free turning as is desirable in some applications. Also, this seal has been found to not create an adequately high vacuum for some requirements especially in glass shaping.

Another known assembly uses a neoprene seal which is mounted on the rotating shaft via metal washers affixed on either side of the seal and to the shaft itself. The seal has a curved outer member which contacts the internal wall of the housing. This type of assembly has been found not to be adequately free turning and capable of high vacuums.

SUMMARY OF THE INVENTION

It is an object of the invention to provide an improved rotating vacuum shaft assembly.

It is another object to provide a rotating vacuum shaft assembly which does not require outside pressure to seal the shaft with respect to the housing.

It is still another object to provide a rotating vacuum shaft assembly which is substantially free turning and which can provide a vacuum pressure as low as 3 ×0 $10^{-8}$ torr.

According to the present invention, a vacuum assembly includes a housing having a first aperture adapted to convey a low pressure into the housing and an internal region communicating with the apertures. The assembly includes at least one seal made of a fluorocarbon polymer material and being disposed around the shaft and within the internal region. The seal has a first deformable rib extending from a first side of the seal and at an angle so as to contact the shaft and a second deformable rib extending from the first side and at an angle so as to contact the wall of the housing inner region. As the pressure at the first side is reduced over that at the second side, the ribs deform to enhance the seal between the shaft and the inner walls of the housing. The seal is floating with respect to both the shaft and the housing thereby giving the shaft enhanced free turning capability.

In one embodiment, the shaft is hollow and adapted to be rotated about its longitudinal axis. In operation the low pressure is conveyed through the hollow shaft. In another embodiment the shaft extends through the assembly and is adapted to either rotate about or move along its longitudinal axis.

DESCRIPTION OF PREFERRED EMBODIMENTS

Figure 2:
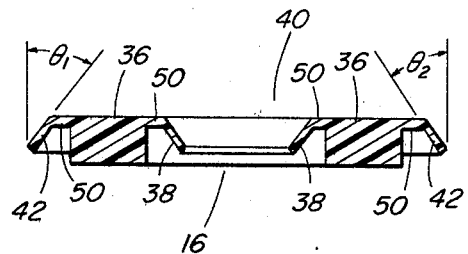
FIG. 2 is a sectional view of the seal member according to the invention.
Figure 1:
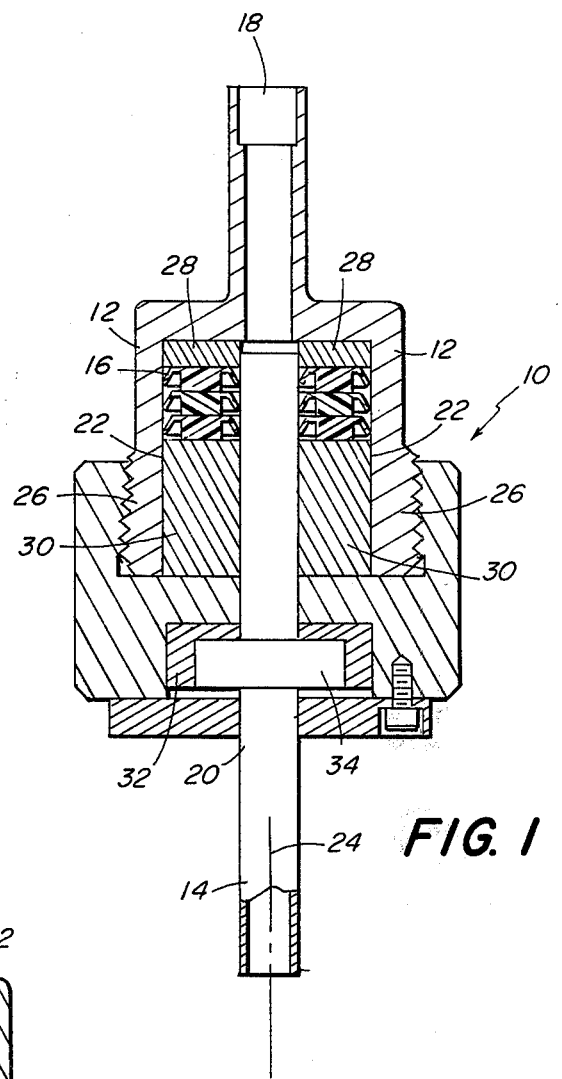
FIG. 1 is a sectional view of a rotating vacuum shaft assembly according to the present invention.

In an exemplary embodiment of the present invention, as illustrated in FIG. 1, a rotating vacuum shaft assembly, represented generally by the reference numberal 10, includes a housing 12, a hollow shaft 14, located partially within the housing 12 and a seal member 16 shown in both FIG. 1 and FIG. 2. The housing 12 has a first aperture 18 which is adapted to be connected to a vacuum pump (not shown). The hollow shaft 14 is positioned within the housing 12 by way of a second aperture 20 in the housing 12. The housing 12 also includes a hollow internal region, represented by the reference numberal 22, this region communicating with the first aperture 18 and the second aperture 20. The hollow shaft 14 is positioned in the second aperture 20 and extends at least partially into the internal region 22 of the housing 12. Both the internal region 22 and the shaft 14 are circular in cross-section with respect to a longitudinal axis 24 of the assembly 10. Preferably, the housing 12 has two sections which are connected together by mutually engaging threads 26. Also, washers 28 and 30 are positioned around the shaft 14 within the internal region 22. Also, preferably, a bushing 32 is provided which receives a washer 34 affixed to the shaft 14.

According to the present invention, the seal 16 is made of a fluorocarbon polymer material and is disposed around the shaft 14 within the internal region 22. The seal 16, as shown more clearly in FIG. 2, has a central, relatively rigid support section 36 to prevent the seal from collapsing in response to the pressure from the vacuum pump (not shown). A first deformable rib 38 extends at an angle from a low pressure side 40 to the seal 16. The rib 38 contacts the surface of the shaft 14, as shown in FIG. 1. A second deformable rib 42 extends at an angle from the low pressure side 40 of the seal so as to contact the wall of the internal region 22 as shown in FIG. 2. In operation, the ribs deform in response to pressure thereby increasing the surface area of contact with the shaft 14 and the internal region 22 by the ribs 38 and 42, respectively. In the preferred embodiment, the thickness of the ribs 38 and 42 is less at the low pressure side 40 than at the ends of the ribs. This is so that the collapsing of the ribs occurs at the low pressure side 40 so that the surface area of the ribs in contact with either the internal region or the shaft is enhanced. In the preferred embodiment, this feature is obtained by making the angle $\theta_1$ which defines the angle of the outer rib surfaces greater than $\theta_2$, the angle of the inner rib surface, the angles being measured with respect to the direction of the thickness dimension of the seal 16. Preferably, $\theta_2$ is 40° and $\theta_1$ is 35°. Also, the thickness dimension of the support section 36 is greater than the dimension of the ribs 38 and 42 in the direction of the thickness dimension of the seal. One advantage of this feature is that when more than one seal is used, as in FIG. 1 where 3 seals are located adjacent one another, the ribs do not interfere with the ability of the seals to be located adjacent one another. It has been found that the preferred angle of the ribs with respect to the shaft or the internal region ranges from about 35° to 45°. When the angle is substantially greater than this amount, the ribs are not properly able to collapse. On the other hand, when the angle is substantially less than this, an inadequate amount of surface area contact with the shaft or the walls is obtained. The presently preferred material from which the seal 16 is formed is a fluorocarbon polymer, such as is available commercially under the tradename Teflon. Teflon is a registered trademark of E. I. du Pont de Nemours & Co. for tetrafluoroethylene fluorocarbon polymers and fluorinated ethylene propylene resins.

In another feature of the seal, a flange 50 interconnects the ribs 38 or 42 to the central section 36. The flanges 50 extend outwardly at substantially a right angle with respect to the central section 36. This feature has been found to give better results than seals without the flange.

Figure 3:
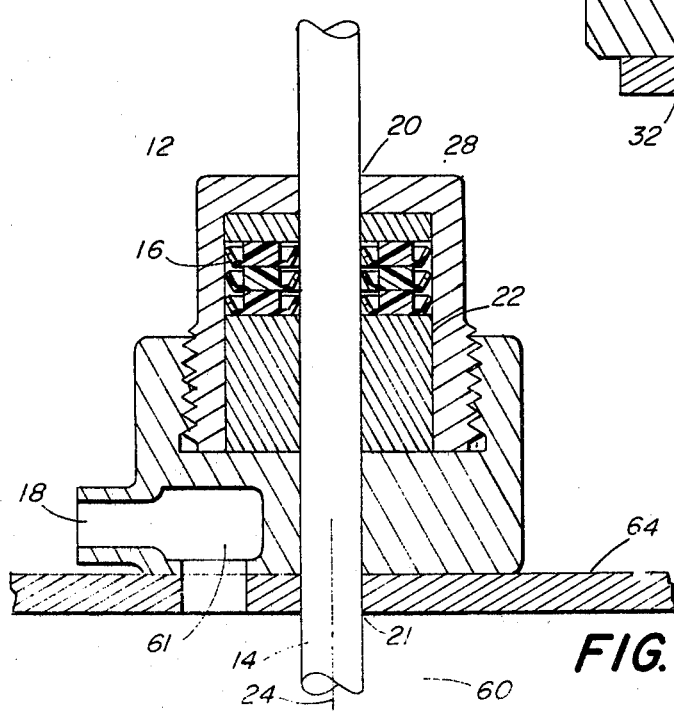
FIG. 3 is a sectional view of an alternative embodiment of the invention in which a shaft is disposed through the assembly and is adapted to move along its axis.

FIG. 3 illustrates an embodiment in which the shaft 14 is adapted both to rotate about and move along its longitudinal axis 24. This arrangement is suitable for use in applications, such as in the thin film technology, in which a shaft must be moved in a vacuum region, such as at 60 in FIG. 3. One application is in depositing a thin film material on a substrate which is affixed to a holding fixture at the lower end of the shaft 14. The region 60 would be under vacuum conditions by connecting a vacuum pump to the first aperture 18. The low pressure is conveyed to the region 60 via the channel 61. A housing chamber, 64, shown partially, is affixed to the assembly such as with fasteners (not shown). In FIG. 3 the orientation of the seals 16 is reversed from that shown in FIG. 1 since in FIG. 3 the low pressure side is at the bottom of the assembly rather than at the top. The shaft 14 is solid in FIG. 3. In operation, the shaft 14 may be both rotated and moved along its axis and the seals 16 maintain the low pressure within the region 60.

The embodiments of the present invention are intended to be merely exemplary and those skilled in the art shall be able to make numerous variations and modifications to them without departing from the spirit of the present invention. All such variations and modifications are intended to be within the scope of the present invention as defined in the appended claims.

We claim:

1. An improved vacuum assembly including:
   a. a housing having a first and a second aperture formed therein and a hollow internal region communicating with the apertures, the first aperture adapted to convey a low pressure into the internal region,
   b. a shaft positioned in the second aperture and extending at least partially into the internal region, and
   c. at least one seal made of a fluorocarbon polymer material and being disposed around the shaft within the internal region, the seal having a central relatively rigid support section to prevent the seal from collapsing in response to the pressure, a first deformable rib extending at an angle from a low pressure side of the seal so as to contact the surface of the shaft and a second deformable rib extending at an angle from the low pressure side so as to contact the wall of the internal region, the ribs deforming in response to pressure thereby increasing the surface area of contact with the shaft and the internal region.

2. The assembly according to claim 1 wherein the shaft is hollow and further including means for maintaining the rotatable shaft symmetrical with respect to the longitudinal axis of the housing.

3. The assembly according to claim 1 further including a removable cover affixed to the housing at the second aperture and located around the shaft for removing the shaft from the housing.

4. The assembly according to claim 2 wherein the means includes a washer affixed to the shaft, the washer being located within a bushing located within the housing.

5. The assembly according to claim 1 wherein the thickness of the ribs is less at the low pressure side than at the ends of the ribs.

6. The assembly according to claim 1 wherein the thickness dimensions of the support section is greater than the dimension of the ribs in the direction of the thickness dimension of the seal.

7. The assembly according to claim 1 wherein the angle ranges from about 35° to 45°.

8. The assembly according to claim 1 wherein the fluorocarbon polymer material is teflon fluorocarbon polymer material.

9. The assembly according to claim 1 wherein at least three seals are used, the seals being adjacent to one another.

10. The assembly according to claim 1 further including flanges interconnecting the central support section to the first rib and to the second rib.

11. The assembly according to claim 1 wherein the housing includes a third aperture and the shaft extends through the second and third apertures and is adapted to move along its longitudinal axis.

* * * * *